United States Patent
Franson et al.

(10) Patent No.: US 7,109,938 B2
(45) Date of Patent: Sep. 19, 2006

(54) TAPERED SLOT FEED FOR AN AUTOMOTIVE RADAR ANTENNA

(75) Inventors: Steven J. Franson, Scottsdale, AZ (US); Bruce A. Bosco, Phoenix, AZ (US); Rudy M. Emrick, Gilbert, AZ (US); John E. Holmes, Scottsdale, AZ (US)

(73) Assignee: Motorola, Inc., Schaumburg, IL (US)

( * ) Notice: Subject to any disclaimer, the term of this patent is extended or adjusted under 35 U.S.C. 154(b) by 13 days.

(21) Appl. No.: 10/978,779

(22) Filed: Oct. 29, 2004

(65) Prior Publication Data

US 2006/0092086 A1    May 4, 2006

(51) Int. Cl.
*H01Q 13/10* (2006.01)
(52) U.S. Cl. .................. 343/767; 343/713; 343/840
(58) Field of Classification Search .......... 343/840, 343/711, 712, 713, 767
See application file for complete search history.

(56) References Cited

U.S. PATENT DOCUMENTS

| | | | | |
|---|---|---|---|---|
| 5,081,466 | A | * | 1/1992 | Bitter, Jr. ............... 343/767 |
| 6,091,363 | A | * | 7/2000 | Komatsu et al. ...... 343/700 MS |
| 6,239,761 | B1 | * | 5/2001 | Guo et al. ............... 343/767 |
| 6,480,160 | B1 | | 11/2002 | Bjornholt et al. |
| 6,542,111 | B1 | | 4/2003 | Wilson |
| 6,563,456 | B1 | | 5/2003 | Hamman et al. |
| 6,646,620 | B1 | | 11/2003 | Bjornholt et al. |
| 6,798,386 | B1 | * | 9/2004 | Louzir .................... 343/840 |

OTHER PUBLICATIONS

Ramesh Garg, Prakash Bhartia, Inder Bahl, Apisak Ittipiboon, Microstrip Antenna Design Handbook, published by Artech House pp. 18-14, 28-29, 480-87, 493-497 Norwood, MA USA (2001).
David M. Pozar, Microwave Engineering, published by Addison-Wesley, pp. 183-184, 199-200 USA (1990).
David M. Pozar, Design of Millimeter Wave Microstrip Reflectarrays, IEEE Transactions on Antennas and Propagation, vol. 45. No. 2 pp. 287-296 USA (Feb. 1997).

* cited by examiner

*Primary Examiner*—Tan Ho
(74) *Attorney, Agent, or Firm*—Thomas V. Miller; Terri S. Hughes; Gary J. Cunningham (57) ABSTRACT

In one embodiment, an improved transceiver assembly for a vehicle capable of detecting potentially hazardous objects is disclosed. The transceiver assembly comprises a tapered slot feed antenna for generating a beam and for detecting the beam as reflected from the potential hazards. The antenna is formed in or on a housing which also contains a parabolic dish that oscillates to sweep the beam of radiation towards the potential hazards outside of the vehicle. In a preferred embodiment, approximately 77 GHz radiation is generated from and detected by the antenna. The antenna is preferably formed on a printed circuit board (PCB) (substrate), which can include additional circuitry necessary to operate the antenna, and which is preferably mounted at an acute angle with respect to the housing to direct the beam at the parabolic dish.

42 Claims, 7 Drawing Sheets

TAPERED SLOT FEED FOR AN AUTOMOTIVE RADAR ANTENNA

CROSS REFERENCE TO RELATED APPLICATION

This application is related to an application filed concurrently herewith, entitled "Patch Array Feed for an Automotive Radar Antenna," U.S. application Ser. No. 10/978,675, now pending which is incorporated herein by reference in its entirety.

FIELD OF THE INVENTION

This invention relates to an antenna structure having a tapered slot feed antenna in conjunction with a parabolic dish, particularly useful in a collision detection system in a vehicle.

BACKGROUND

Automotive technologies continually strive to make vehicles safer. In one aspect of vehicle safety, it is known to provide a vehicle with means to detect potential collisions and to take appropriate actions to avoid the same. For example, vehicles have been equipped with numerous types of sensors (e.g., infra-red sensors) which are able to broadcast radiation towards a potential obstacle (a tree, building, or another vehicle for example), receive radiation reflected from that obstacle, and determine that obstacle's distance and hence its potential as a collision hazard.

Figure 1:
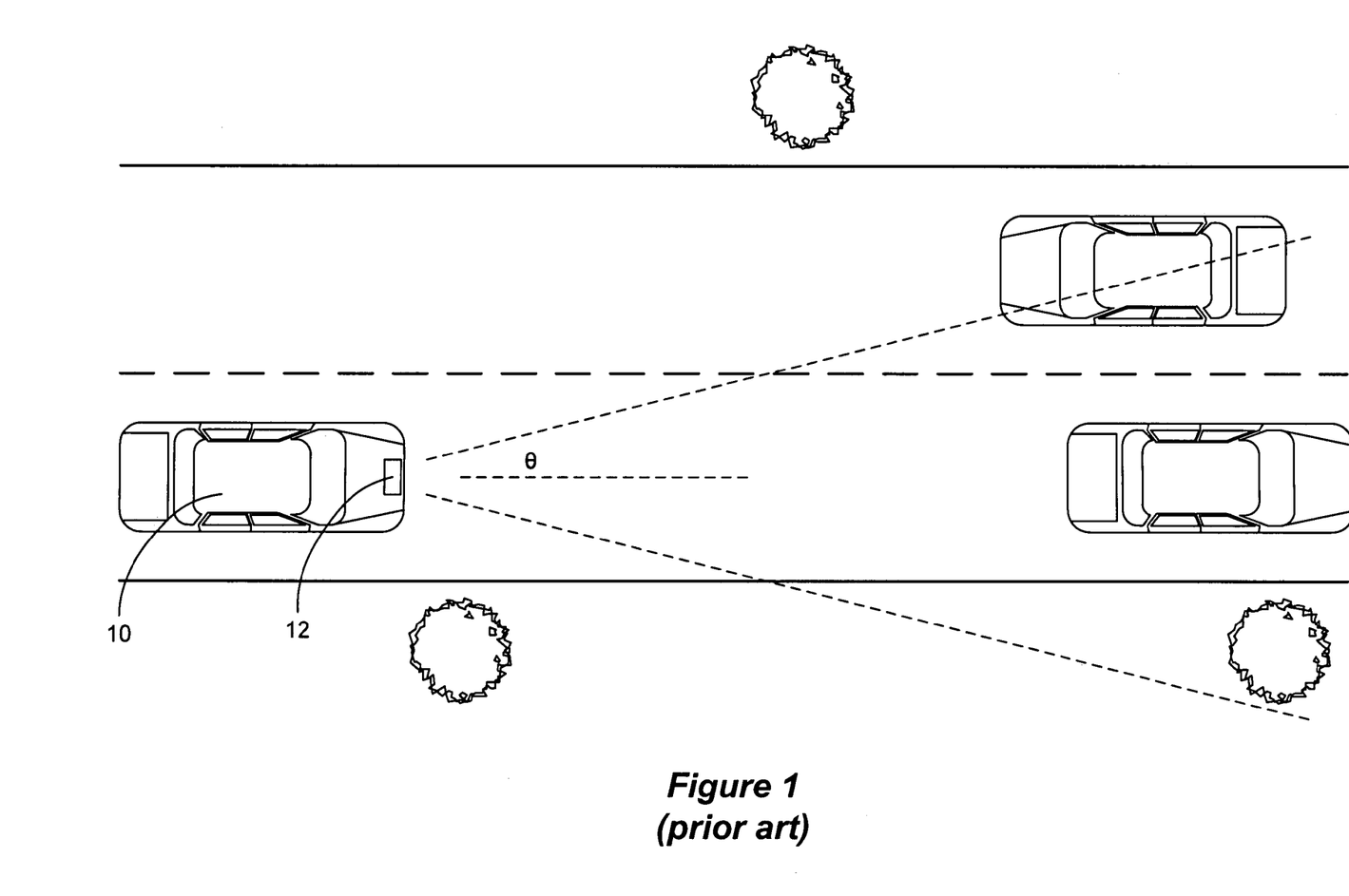
FIG. 1 illustrates use of a prior art collision detection system, in which an oscillating transceiver is incorporated into a bumper of a vehicle.

A developing technology in this area comprises antenna structures operating at or near 77 GHz frequencies. Such antenna structures include the ability to transmit and detect reflected 77 GHz radiation, and thus may be referred to as transceivers. A simple illustration of such a transceiver 12 mounted in a vehicle 10 is illustrated in FIG. 1. The transceiver 12 may be mounted anywhere in the vehicle 10 so long as the transmission and detection of the radiation is not significantly impeded, and preferably may be mounted inside the bumper of the vehicle. In the specific example illustrated, the transceiver 12 is positioned in the front bumper of the vehicle allowing for assessment of potential hazards in front of the vehicle. As the broadcast radiation is preferably generally beam shaped, it is usually beneficial to cause the radiative beam to oscillate from left to right in front of the vehicle so as to "sweep" an arc-shaped sector in front of the vehicle. Using 77 GHz transceivers, the beam is usually swept between +/−10 degrees ($\theta$) at a frequency of about 10 Hz or so, and has an effective distance for assessing potential hazards of approximately 100 meters. When such a transceiver 12 is incorporated into a vehicle 10, potential collision hazards can be detected, which is useful in its own right as a safety feature, and is further useful in other respects, for example, as input to an adaptive cruise control system which automatically slows the car when hazards are detected at a certain distance.

Figure 2A:
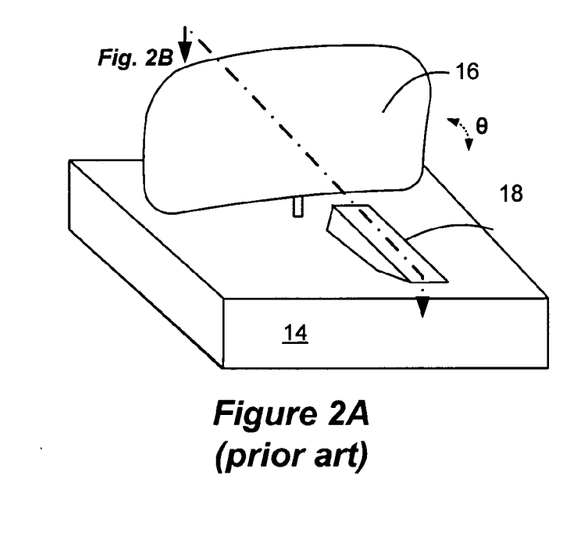
FIGS. 2A and 2B illustrate a prior art transceiver of the type illustrated in FIG. 1 incorporating the use of a horn antenna.
Figure 2B:
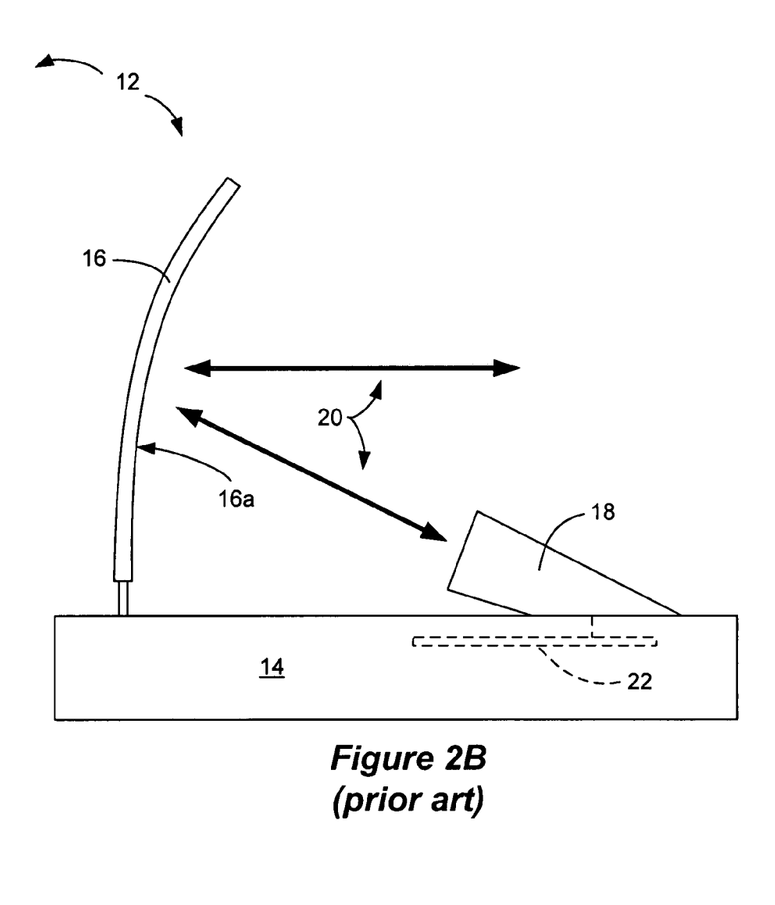

FIGS. 2A and 2B show the basic components of a typical transceiver 12 in further detail, including a parabolic reflector dish 16, a horn antenna 18, relevant electronics as exemplified by a printed circuit board (PCB) 22, and a substrate structure or housing 14 for mounting and/or housing the same. The PCB 22 generates and transmits the radiation 20 from the horn antenna 18, and similarly receives reflected radiation from a potential collision hazard as noted above. The horn antenna 18 is located at a focal point of the parabolic reflective surface 16a of the dish 16 such that radiation 20 broadcast from the horn antenna leaves the dish 16 in a generally horizontal beam, and similarly so that reflected radiation 20 is eventually focused back to the horn antenna 18 and the PCB 22 for detection. (The dish 16 as shown generally represents the "upper half" of a parabola). Other antenna configurations have been used with vehicular radar sensors, but using a parabolic antenna is generally preferred for producing a narrow beam for multiple object detection.

As noted earlier, the beam is swept (i.e., through angle $\theta$) in any number of well known ways, for example, by causing the parabolic dish 16 to oscillate back and forth. Because such oscillation schemes are well known and not particularly important in the context of the invention, such details are not shown. However, it suffices to say that the dish 16 can be made to oscillate with respect to the housing 14 by mounting it thereto with springs or dampers to allow the dish to swivel, and by cyclically powering solenoids within the housing 14 to swivel the dish 16 by electromagnetic force.

Further details concerning the foregoing concepts and transceiver structures and controls can be found in U.S. Pat. Nos. 6,542,111; 6,646,620; 6,563,456; and 6,480,160, which are incorporated herein by reference in their entireties.

A major drawback to the collision detection transceiver 12 of the type illustrated is its cost, particularly as it related to the horn antenna 18. As a three-dimensional waveguide, the horn antenna is generally rather complex to design and manufacture, as the angles, lengths and the other various dimensions of the waveguide must be specifically tailored to give optimum performance for the radiation 20 (i.e., at 77 GHz) in question. This accordingly adds significant cost to the transceiver 12, which generally hampers use of the transceiver in vehicles that generally cannot be labored with substantial add-on costs. Moreover, from a functional standpoint, the use of the horn antenna adds additional structural complexity to the overall design of the transceiver assembly, as it essentially "sticks out" of the assembly, must be precisely coupled to the PCB 22, is susceptible to damage and misalignment, etc.

In short, room exists to improve upon existing vehicular collision detection transceivers, and this disclosure presents solutions.

SUMMARY OF THE INVENTION

In one embodiment, an improved transceiver assembly for a vehicle capable of detecting potentially hazardous objects is disclosed. The transceiver assembly comprises a tapered slot feed antenna for generating a beam and for detecting the beam as reflected from the potential hazards. The antenna is formed in or on a housing which also contains a parabolic dish that oscillates to sweep the beam of radiation towards the potential hazards outside of the vehicle. In a preferred embodiment, approximately 77 GHz radiation is generated from and detected by the antenna.

The antenna of the transceiver assembly is preferably located at a focus of a parabolic surface of the dish, and is formed on a printed circuit board (PCB) (substrate). The beam generated from the antenna is preferably parallel with a plane of the PCB. The PCB can include additional circuitry necessary to operate the antenna, such as an oscillator to generate the beam, and a mixer for downconverting reflected beams, and such circuitry may be formed on the opposite side of the PCB from the antenna. The antenna may feed to such additional circuitry via a microstrip which indirectly couples to the antenna though the substrate.

Because the beam generated from the antenna is parallel with a plane of the substrate, it is preferable to mount the PCB at an acute angle with respect to the housing to direct the beam at the parabolic dish, such as by mounting the PCB on a wedge. The antenna may be integral with the housing, formed on the housing, positioned within the housing, or at least partially exposed through the housing, so long as the loss of signal through any materials present on the assembly is minimized.

The transceiver assembly is preferably mounted to or within a vehicle, such as in its bumper. The reflected signals can be transformed into a signal indicative of the potential hazard, which may in turn be sent to a vehicle communication bus to reduce a speed of the vehicle in a cruise control application, for example. Alternatively, the signal indicative of the potential hazard can be broadcast to the user, either audibly, visually, or both.

BRIEF DESCRIPTION OF THE DRAWINGS

Embodiments of the inventive aspects of this disclosure will be best understood with reference to the following detailed description, when read in conjunction with the accompanying drawings, in which.

DETAILED DESCRIPTION

Figure 3A:
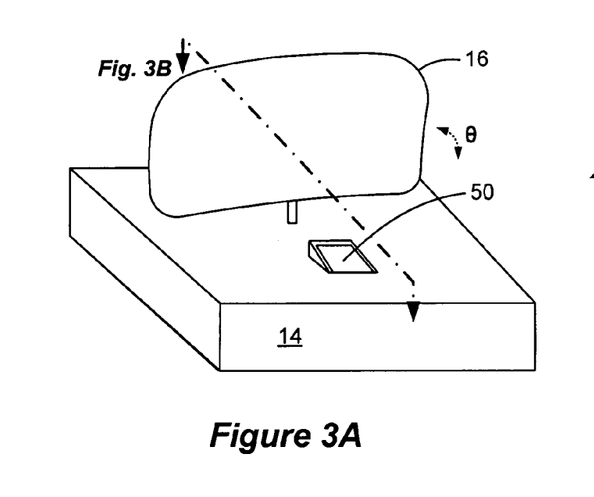
FIGS. 3A and 3B illustrate the improved transceiver, incorporating the use of a tapered slot feed antenna.
Figure 3B:
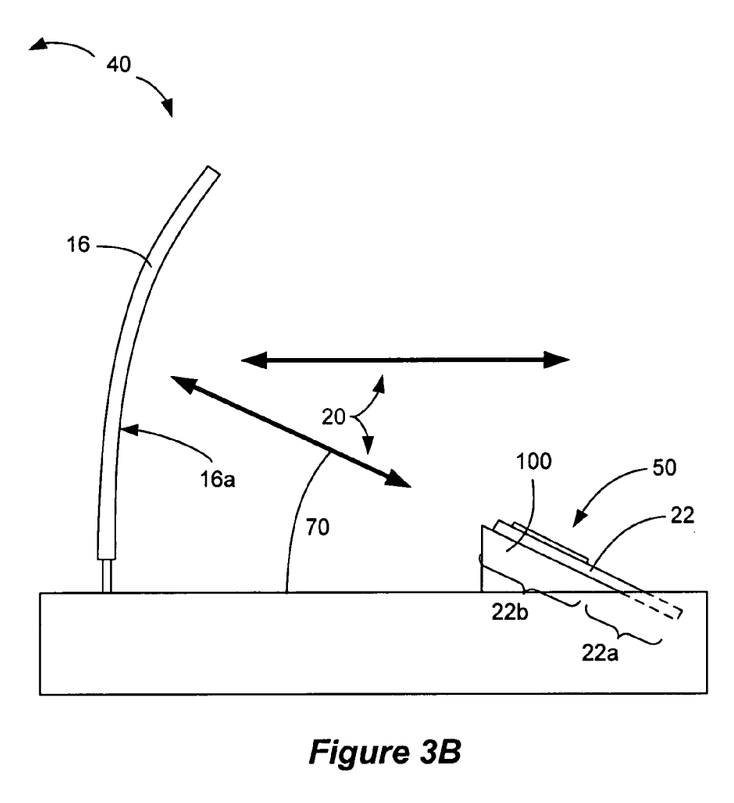

FIGS. 3A and 3B illustrate an embodiment of an improved vehicular collision detection transceiver 40 which employs a tapered slot feed antenna 50 in lieu of the horn antenna 18 used in prior designs (see FIGS. 2A & 2B). A primary characteristic of the tapered slot feed antenna is that it emanates radiation parallel to the substrate, and thus is sometimes referred to as an "end-fire" type antenna.

The tapered slot feed antenna 50 works in a similar fashion to the horn antenna 18, i.e., it is capable of broadcasting and receiving radiation 20 and hence is useful in the context of the disclosed vehicular collision detection transceiver. However, the design of the transceiver is simplified, and is made significantly less expensive, through the use of the tapered slot feed antenna 50. As can be seen in FIG. 3B, and as will be made explained in further detail later, the tapered slot feed antenna 50 is preferably formed on the PCB (or more generically, "substrate") 22 which includes the other circuitry needed for operation of the transceiver 40. Such additional and well-known circuitry includes the oscillators or resonators necessary to form the 77 GHz radiation, other integrated circuits such as amplifiers, filters, a mixer for downconverting the detected beam as reflected from the objects, passive structures such as capacitors and inductors, and further preferably includes the processors necessary to process the detected reflected radiation to form a signal or signals which can be sent to the vehicle communication bus to indicate the detected potential hazard. The oscillators can directly create a signal at 77 GHz, or may operate at lower frequencies which are then multiplied up to 77 GHz. Because such circuitry and its manner of interfacing with a vehicle communication bus is well known, it is not shown for simplicity (see box 53, FIG. 4A).

In any event, through the use of the tapered slot feed antenna 50, the use of an expensive and relatively mechanically-complex horn antenna is obviated. The design provides further benefits in that the tapered slot feed antenna 50 can be formed onto the same PCB 22 used in the transceiver for other purposes, as just noted, in effect combining the circuitry and antenna functions into a single substrate which is less susceptible to alignment problems and potential damage. Moreover, the generated beam of radiation 20 need not be steered in its direction from the PCB 22 as is required in more complex multiple-phase patch approaches (see the above-incorporated patent application). Instead, the beam is highly directive and of low beamwidth, thus allowing only a single antenna 50 to be used (although an array of antennas could also be used if desired to provide even higher directivity).

Figure 4A:
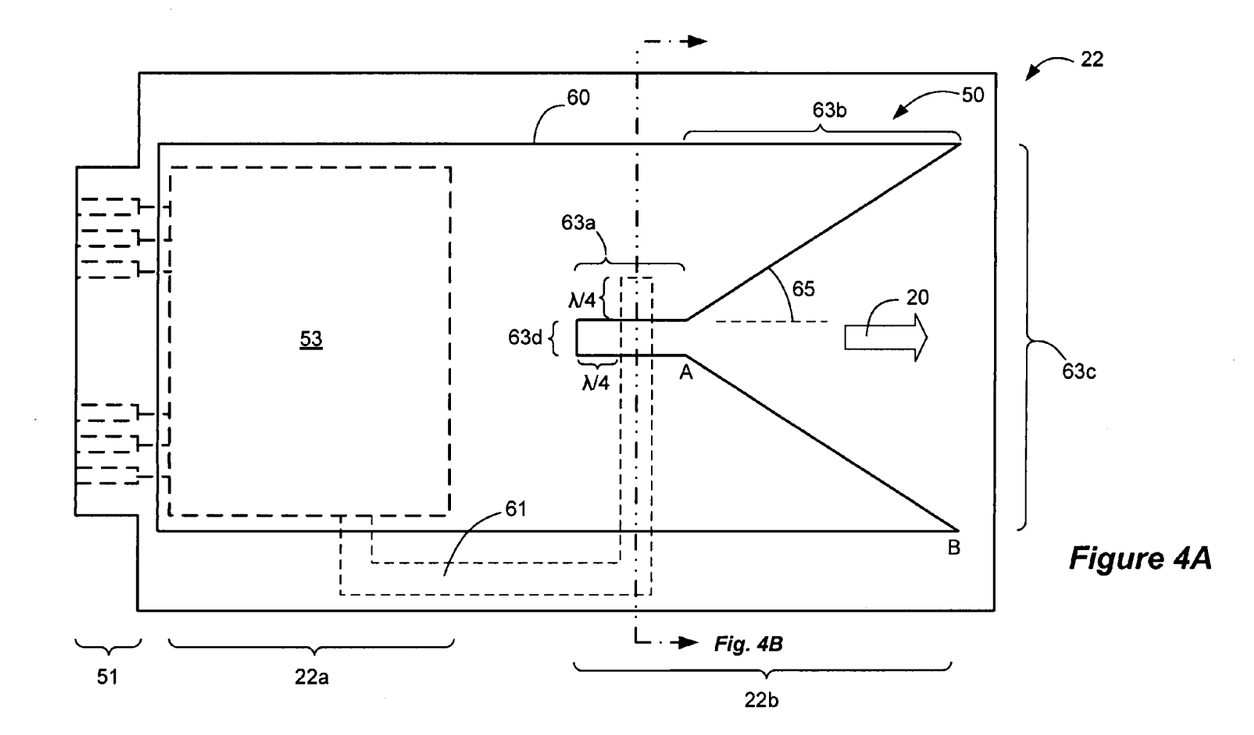
FIGS. 4A and 4B respectively illustrate the top and bottom of an exemplary printed circuit board having the tapered slot feed antenna and other components.
Figure 4B:
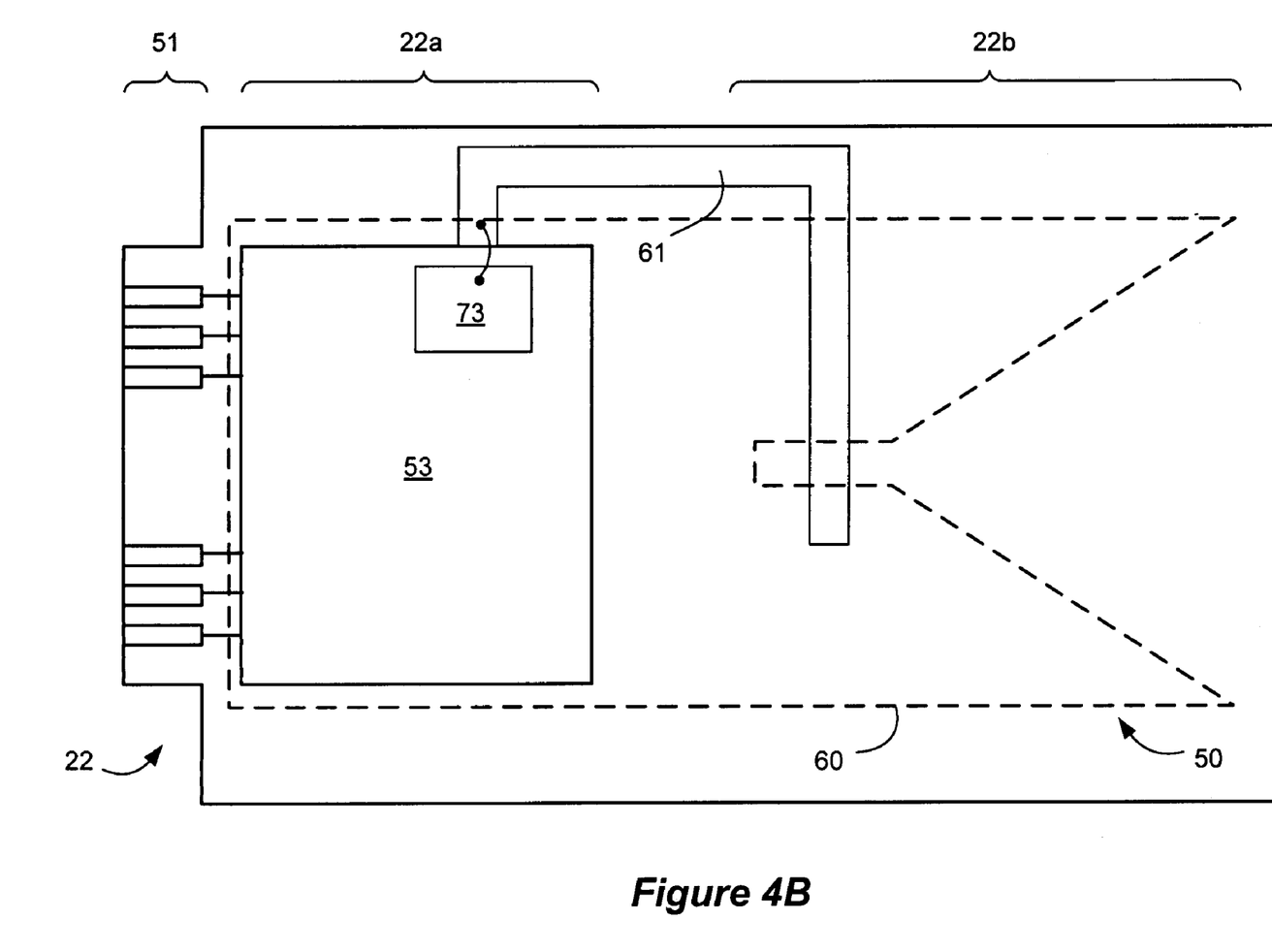
Figure 4C:
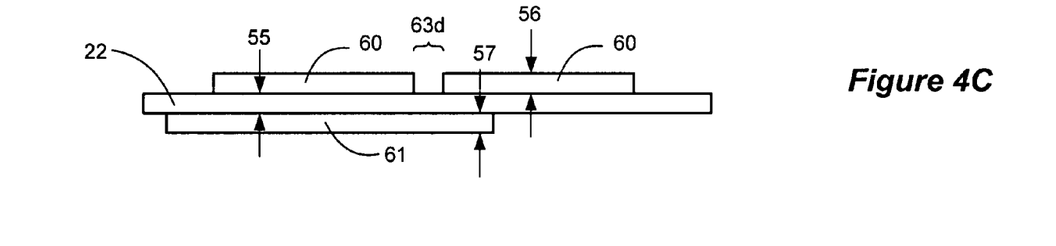
FIG. 4C represents a cross sectional view through the printed circuit board.

The tapered slot feed antenna 50 as formed in an exemplary embodiment on the PCB 22 is shown in further detail in FIGS. 4A–4C, with FIGS. 4A and 4B respectively showing top and bottom views of the PCB 22, and FIG. 4C showing a cross sectional view. As shown, the antenna 50 is comprised of grounded metallic plane 60 formed as a tapered slot. The slot is initially untapered at a portion intersecting a feedline 61 (to be explained further below) on the other side of the PCB 22. Thereafter, the slot is tapered from point A to point B (FIG. 4A). While illustrated as a linear taper, one skilled in the art will recognize that the taper may be exponential in nature (e.g., a Vivaldi antenna), or may comprise at least one sudden increase in size (i.e., in a stepped configuration). "Tapered" as used herein should be understood as referring to all such configurations, i.e., any configuration in which the size of the slot is increased. The antenna 50 can be thought of as comprising a slot in the grounded metallic plane 60.

The configuration of the disclosed metallic plane 60 will depend on the desired frequency at which the antenna will operate. For a 77 GHz antenna, the width of the untapered portion of the slot 63d might be approximately 10 microns; the length of the untapered portion of the slot 63a would be less than one wavelength (i.e., approximately 3.9 mm); the length of the tapered portion of the slot 63b might be approximately four wavelengths (i.e., approximately 15.6 mm); and the maximum width of the slot 63c might be approximately 0.8 of a wavelength (or about 3.2 mm), rendering a taper angle 65 of about 12 degrees. Of course, these dimensions are merely exemplary, and are not shown drawn to scale in the Figures. Varying the width of the slot modulates the impedance between the slot from approximately 50 ohms at point A (a figure meant to match the impedance of the circuitry 53 to which the antenna 50 is connected) to an impedance of 377 ohms at point B. This latter impedance value is meant to match the impedance normally encountered in the ambient air which surrounds the patches (along with the material of the PCB 22). Further details concerning slotline antennas of the sort disclosed can be found in Ramesh Garg, "Microstrip Antenna Design Handbook," published by Artech House, pp. 486–87 (2001), while further details concerning slotline-type transmission lines can be found in David M. Pozar, "Microwave Engineering," published by Addison-Wesley, pp. 199–200 (1990), which are both incorporated herein by reference.

In a preferred embodiment, the tapered slot feed antenna 50 is fed by a feedline (or "microstrip") 61 formed on the bottom of the PCB 22, which couples energy to the slot on the top of the PCB. See Ramesh Garg, "Microstrip Antenna Design Handbook," published by Artech House, pp. 486–87 (2001), which is incorporated herein by reference. The overlapping dimensions between the untapered portion of the slot and the feedline 61 are critical to the coupling efficiency of the antenna 50, and are preferably one-quarter wavelength. Through this configuration, reflected waves interfere constructively at the point where energy is coupled between the feedline 61 and the slot.

As best shown in FIG. 4B, the feedline 61 is itself coupled to other circuitry needed for operation of the transceiver 40 (such as the oscillators, tuners, receivers, etc.), which is represented generally by circuit block 53, as mentioned above. One exemplary integrated circuit in circuit block 53 is shown as integrated circuit 73, which might comprise the oscillator for example. As shown, the integrated circuit 73 is preferably a "bare die," i.e., an unpackaged integrated circuit. As one skilled in the art will understand, the use of bare dies are preferable when operating at high frequencies such as 77 GHz, as packaging the integrated circuits can add unwanted parasitic capacitance and inductance. The connection established between the integrated circuit 73 and the feedline 61 as shown comprises a bond wire as is used traditionally in semiconductor manufacturing. (Of course, additional integrated circuits could also be connected to the feedline 61, but this is not shown for clarity). Although only one bond wire is shown, additional bond wires in parallel could be used and the use of such multiple connections is preferable to improve electrical coupling between the integrated circuit 74 and the feedline 61. Other connecting means such as a ribbon bond could also be used, for example. Generally this connection should be as short, flat, and mechanically resilient as possible. The feedline 61 can have a width of approximately 120 microns, and can be alternatively shaped. For example, the feedline 61 can be straight and perpendicular to the direction of the emanated beam, as is disclosed in Ramesh Garg, "Microstrip Antenna Design Handbook," published by Artech House, pp. 14, 487 (2001), which is incorporated herein by reference.

In one embodiment, the integrated circuit 73 can be placed in a hole in the PCB 22 and conductively epoxied to a ground plane (e.g., plane 60) on the PCB. Such configuration is not shown in the drawings, but such considerations are disclosed and discussed in the above-referenced patent application. Such modification would be most useful in a configuration in which the integrated circuit(s) 73 and the tapered slot feed antenna 50 are formed on the same side of the PCB, such as disclosed in FIG. 5D and discussed further below.

Once the PCB 22 is formed, care should be taken not to damage any exposed connections, such as the bond wires. Accordingly, the circuitry can be covered by a low-loss cap or lid to protect the components and connection, and/or appropriate recesses can be formed in the housing 14 to allow clearance for such components and connections, as explained further below. Such components may also be covered with a protective epoxy once formed, but this is less preferred as it might add additional capacitance and inductance to the circuitry and hamper performance.

The PCB 22 can also include a connector portion 51 suitable for connecting the PCB and its traces to an edge connector (not shown), which for example might couple to a vehicle communication bus (not shown). The various leads in the connector portion 51 would carry power, control and data (i.e., reflection data) between the PCB 22 and the vehicle in which the transceiver 40 is placed. For example, when a reflected signal is detected through its resonance of the antenna 50, that signal is preferably processed at circuit block 53 and causes a signal (i.e., indicator) to be sent to a lead or leads on the connector portion to inform the vehicle of the detected potential hazard. Such signal can then be sent by the vehicle communication bus to the control system of the vehicle, for example, to cause the vehicle to reduce its speed. Or, such signal might merely be audibly broadcast to a user of the vehicle (e.g., a "beep" or a warning voice message), or displayed to the user (e.g., a lit LED or an indication on an interface screen), or both. Alternatively, processing of the reflected signals can be performed off of the PCB 22.

As best shown in FIG. 4A, radiation 20 will emit from the tapered slot in a beam parallel to the PCB 22, i.e., parallel to the slot. See Ramesh Garg, "Microstrip Antenna Design Handbook," published by Artech House, pp. 480–87 (2001), which is incorporated herein by reference. The beam of radiation is narrow and enjoys a high gain, making particularly useful for the collision detection function for which the transceiver 40 is designed. To properly direct this beam to the parabolic dish 16 (and to likewise received reflected radiation), the PCB 22 is preferably angled with respect to the housing 14 to direct the beam at an acute angle 70 with respect to the housing 70, as best shown in FIG. 3B. Such angling can be accompanied in any number of ways, but in a preferred embodiment preferably comprises the use of a wedge 100 formed on or in the housing. As shown FIG. 3B, it is preferred that the wedge 100 allow at least a portion 22b of the PCB 22 containing the tapered slot feed antenna 50 to be free from the housing 14 so that the radiative beam 20 is not impeded. However, other portions 22a of the PCB 22 (e.g., those containing other circuitry 53) could be recessed within the housing 14, which could be beneficial in protecting such structures.

Figure 5A:
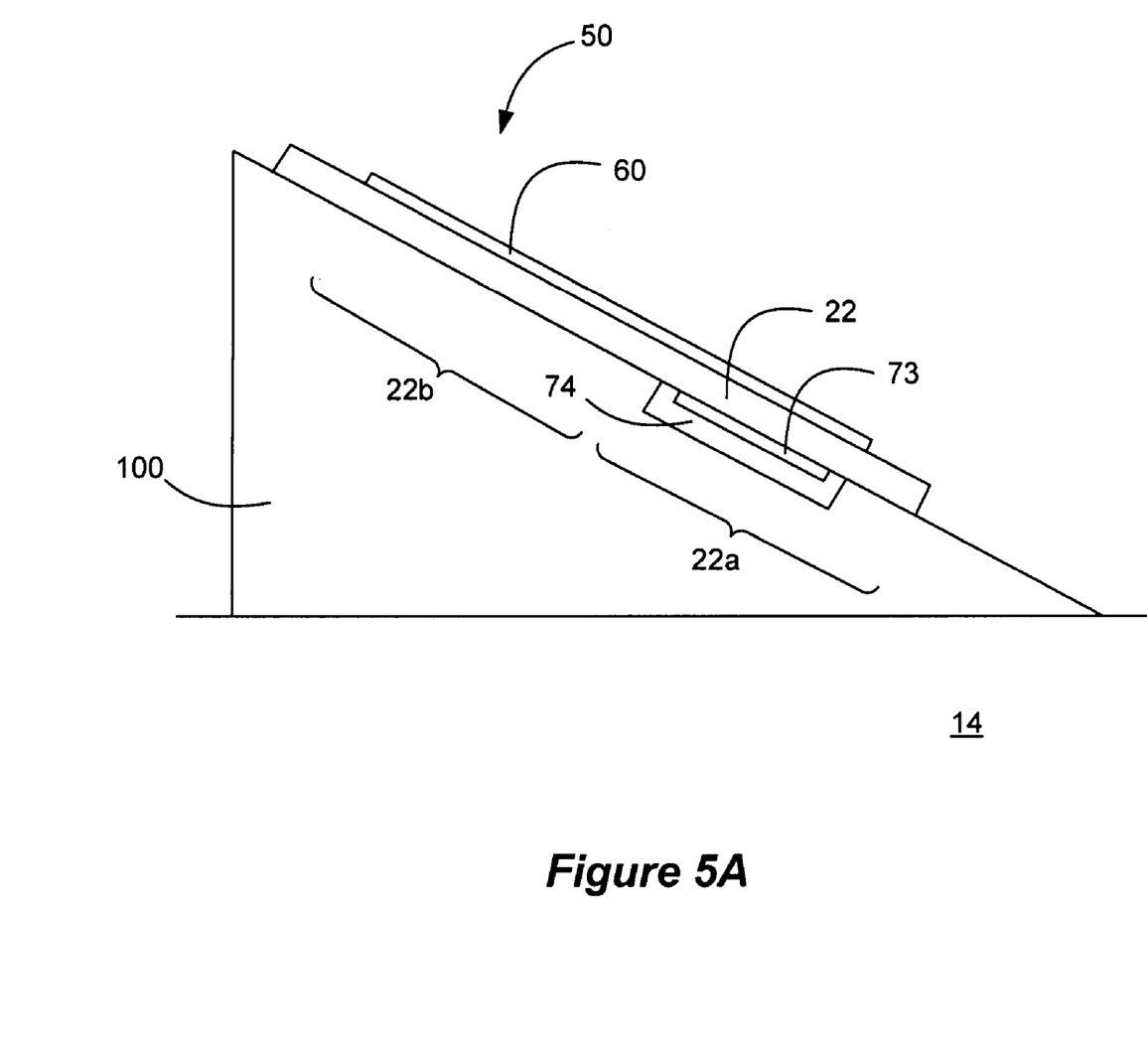
FIGS. 5A–5D illustrate various ways in which the printed circuit board having the antenna can be mounted with the housing.
Figure 5B:
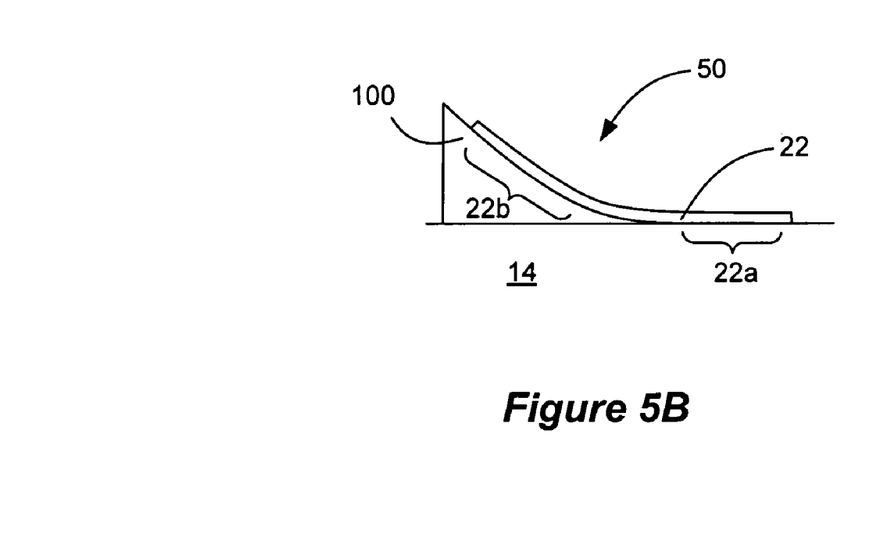
Figure 5C:
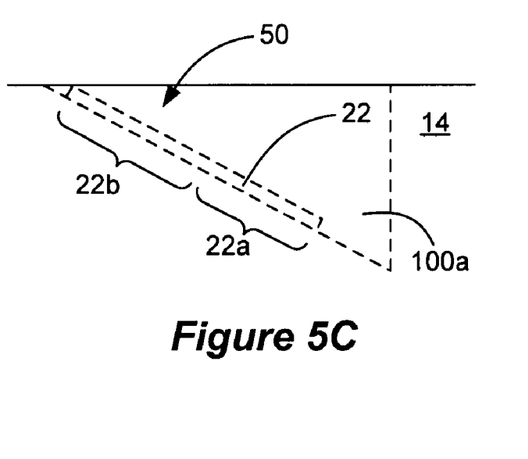

Further details comprising the mounting of the PCB 22 to the housing are shown in FIG. 5A. In particular, it can be seen that a recess or hole 74 has been formed in the wedge 100 so as to provide clearance for the various integrated circuits 73 that might be used and their connections such as the wire bonds for coupling the same to the feedline 61. Moreover, the wedge 100 need not be formed on the housing 14, but instead may be formed as a wedge-shaped recess 110a in the housing, as shown in FIG. 5C, a configuration which is particularly preferred to improve the sleekness of the transceiver 40, and to shield the antenna 50 from becoming damaged or misaligned. Additionally, should a flexible PCB 22 material be used (such as a polyimide or a liquid crystal polymer substrate), the wedge 100 upon which the PCB 22 is mounted can be curved, as in FIG. 5B. A "wedge" formed "on the housing" should be understood as including any of these embodiments, and should be further understood as including wedges or other angled surfaces which are completely or partially formed within a recess in the housing.

Figure 5D:
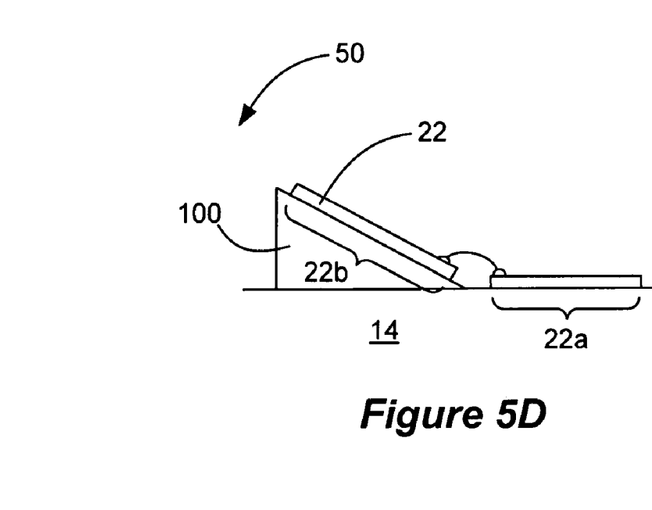

Additionally, one skilled in the art will realize that different feed mechanisms other than the use of an underlying, indirectly-coupled feedline 61 may be used as well. Thus, the metallic plane 60 may be directly fed by the integrated circuit(s) 73 without relying on coupling through the PCB 22. In such a case, the circuitry 53 may be formed on the same side (i.e., top) of the PCB 22 as is the tapered slot feed antenna 50, as illustrate in FIG. 5D. Moreover, the portions 22a (having the additional circuitry) and 22b (having the antenna 50) of the PCB 22 may be physically separated, as shown in FIG. 5D. In short, there are many different ways to feed the disclosed tapered slot feed antenna 50, and/or to configure the PCB 22 and it associated circuitry.

A cross section of the PCB 22 Is shown in FIG. 4C. In a preferred embodiment, a high quality PCB material with a low dielectric constant and a low loss tangent is desired given the high frequencies with which the PCB 22 will be used. Thus, standard FR4 PCB materials may not be acceptable to properly function at 77 GHz without significant loss of signal. Instead, the PCB 22 may be formed of Duroid™ material (i.e, a glass microfiber reinforced polytetrafluoroethylene (PTFE) composite) or other high frequency laminates, such as is available from Rogers Corporation of Rogers Connecticut. (See http://www.rogerscorporation.com/acm/lndex.htm). Additionally, ceramic substrates (such as low-temperature co-fired ceramics), liquid crystal polymers substrates, and or foam substrates can be used as the material for PCB 22. A foam substrate Is particularly preferred as it will have a dielectric constant close to that of air and hence will mitigate loss of signal. The thickness 57 of the PCB 22 can range from approxImately 2 to 20 mils thick. The metallic traces and planes (e.g., 60) formed on the PCB 22 are preferably corrosion resistant, which is desirable given the harsh conditions in which the transceiver 40 will be used in a vehicular environment. Accordingly, such traces and their associated patches 60 are preferably gold, or copper, or at least gold coated. The thickness of and top and bottom metallization 56, 57 can be approximately 10 to 20 microns, and obviously is not drawn to scale in FIG. 4B.

Although preferred embodiments are described, one skilled in the art of antenna physics will understand that the desired functionality of the tapered slot feed antenna 50 can be achieved in many different ways. The number of slots, their size, the nature in which they are arrayed, their respective distances, the materials used to form them, the frequencies at which they resonate, etc., can be easily varied to arrive at any number of variations. Accordingly, none of these parameters is crucial, and the invention should not be understood as limited to any of these particulars as disclosed. Moreover, while particularly useful in the broadcast and detection of 77 GHz radiation, the disclosed tapered slot feed antenna 50 can be used with (and tailored for) other frequencies as well. For example, future transceiver assemblies may use even higher frequencies, such as 140 GHz, 220 GHz, or any other publicly available band, with the use of such higher frequencies allowing the antenna to be made smaller and/or more directive. Additionally, and although not shown, more than one tapered slot antenna could be used, in effect forming an array of antennas each with its own beam. However, because the beam of the disclosed antenna is narrow, it would be expected that a suitably directive transceiver 40 could be achieved with a single beam configuration. One skilled in the art would recognize that an alternate end-fire antenna, or an array of such antennas, could be used in place of the disclosed tapered slot antenna.

The overall construction of the vehicular collision detection transceiver 40 is likewise susceptible to various modifications. As shown in FIG. 3B, only that portion 22b of the PCB 22 containing the tapered slot feed antenna 50 may be exposed outside of the housing 14, while other portions 22a of the PCB 22 (i.e., those containing the other necessary circuitry 53) are covered. This is generally preferred to reduce loss between the antenna 50 and the dish 16 while still protecting the circuitry. However, this is not strictly necessary, as the entirety of the PCB 22, including portion 22b can be covered by the housing 14 so long as the housing is not generally reflective (i.e., metallic) in a manner to interfere with the transceiver 40's use. In this regard, it should also be noted that it is preferable that the bumper or other structure on the vehicle in which the transceiver is placed (mounting not shown) be similarly transmissive to the radiation emitted from and detected by the transceiver. (For example, the bumper would preferably be free of metallic paint). Of course, some degree of loss is inevitable and permissible. Ultimately, the entirety of the transceiver 40 would be encapsulated within a low-loss radome (not shown) to protect the transceiver from the harsh conditions in which it will operate within a vehicle, as is well known. As alluded to earlier, if exposed circuitry and/or connections are present, care should be taken to mount the PCB 22 to or within the housing 14 in such a manner as to mechanically protect such structures, such as by the use of recesses, spacers, protective caps or lids, etc.

While preferably disclosed as a having a parabolic reflector dish 16, one skilled in the art will understand that the disclosed transceiver 40 may be formed using other types of reflectors. For example, the dish 16 may be replaced by a "reflectarray," which essentially constitutes a plurality of patches tuned to reflect radiation similarly to a parabolic antenna. See Pozar, "Design of Millimeter Wave Microstrip Reflectarrays," IEEE Transactions on Antennas and Propagation, Vol. 45, No. 2, pp. 287–296 (February 1997), which is incorporated herein by reference.

The disclosed antenna could also be designed for specific polarizations of the radiation 20, which is useful because some objects being detected might reflect certain polarizations differently. See Ramesh Garg, "Microstrip Antenna Design Handbook," published by Artech House, pp. 493–497 (2001), which is incorporated herein by reference.

Although disclosed in the context of being useful within a vehicle, the disclosed transceiver assembly can be used in other contexts as well to detect the presence of objects other than those present while driving.

It should be understood that the inventive concepts disclosed herein are capable of many modifications. To the extent such modifications fall within the scope of the appended claims and their equivalents, they are intended to be covered by this patent.

What is claimed is:

1. A transceiver assembly for detecting objects, comprising:
    a reflector coupled to a housing, wherein the reflector moves to sweep a beam of radiation to detect the objects and to receive the beam as reflected from the objects; and
    a tapered slot feed antenna for generating the beam and for detecting the beam as reflected from the objects.

2. The transceiver assembly of claim 1, wherein the antenna is located at a focus of a parabolic surface of the reflector.

3. The transceiver assembly of claim 1, wherein the antenna is formed on a substrate.

4. The transceiver assembly of claim 3, wherein the substrate is selected from a group consisting of a glass microfiber reinforced polytetrafluoroethylene composite, a liquid crystal polymer material, a low-temperature co-fired ceramic material, and a foam material.

5. The transceiver assembly of claim 3, wherein the generated beam emanates from the antenna parallel with a plane of the substrate.

6. The transceiver assembly of claim 3, wherein the substrate further comprises additional circuitry to operate the antenna.

7. The transceiver assembly of claim 6, wherein the additional circuitry is located on an opposite side of the substrate from the antenna.

8. The transceiver assembly of claim 6, wherein the additional circuitry comprises an oscillator to generate the beam, and a mixer for downconverting the detected beam as reflected from the objects.

9. The transceiver assembly of claim 6, wherein the additional circuitry is indirectly coupled to the antenna though the substrate.

10. The transceiver assembly of claim 3, wherein the substrate is mounted at an acute angle with respect to the housing.

11. The transceiver assembly of claim 1, wherein the antenna is formed on the housing.

12. The transceiver assembly of claim 1, wherein the antenna is formed on a wedge on the housing.

13. The transceiver assembly of claim 12, wherein the antenna is at least partially exposed through the housing.

14. The transceiver assembly of claim 1, wherein the radiation is approximately 77 GHz.

15. The transceiver assembly of claim 1, wherein the assembly is mounted to or within a vehicle.

16. A transceiver assembly for detecting objects, comprising:
    a reflector coupled to a housing, wherein the reflector moves to sweep a beam of radiation to detect the objects and to receive the beam as reflected from the objects; and
    an antenna formed on a substrate for generating the beam and for detecting the beam as reflected from the objects, wherein the generated beam emanates from the antenna parallel with the substrate.

17. The transceiver assembly of claim 16, wherein the antenna is located at a focus of a parabolic surface of the reflector.

18. The transceiver assembly of claim 16, wherein the substrate is selected from a group consisting of a glass microfiber reinforced polytetrafluoroethlene composite, a liquid crystal polymer material, a low-temperature co-fired ceramic material, and a foam material.

19. The transceiver assembly of claim 16, wherein the antenna comprises a tapered slot feed antenna.

20. The transceiver assembly of claim 16, wherein the substrate further comprises additional circuitry to operate the antenna.

21. The transceiver assembly of claim 20, wherein the additional circuitry is located on an opposite side of the substrate from the antenna.

22. The transceiver assembly of claim 20, wherein the additional circuitry comprises an oscillator to generate the beam, and a mixer for downconverting the detected beam as reflected from the objects.

23. The transceiver assembly of claim 20, wherein the additional circuitry is indirectly coupled to the antenna though the substrate.

24. The transceiver assembly of claim 16, wherein the substrate is mounted at an acute angle with respect to the housing.

25. The transceiver assembly of claim 16, wherein the antenna is formed on the housing.

26. The transceiver assembly of claim 16, wherein the antenna is formed on a wedge on the housing.

27. The transceiver assembly of claim 26, wherein the antenna is at least partially exposed through the housing.

28. The transceiver assembly of claim 16, wherein the radiation is approximately 77 GHz.

29. The transceiver assembly of claim 16, wherein the assembly is mounted to or within a vehicle.

30. A vehicle having a transceiver assembly for detecting objects outside of the vehicle, comprising:
    a transceiver assembly mounted to or within the vehicle, the assembly comprising:
        a reflector coupled to a housing, wherein the reflector moves to sweep a beam of radiation to detect the objects and to receive the beam as reflected from the objects; and
        a tapered slot feed antenna for generating the beam and for detecting the beam as reflected from the objects; and
    circuitry to process the detected reflected beam to provide an indication of the object.

31. The vehicle of claim 30, wherein the antenna is formed on a substrate.

32. The vehicle of claim 31, wherein the substrate further comprises the circuitry to process the detected reflected beam.

33. The vehicle of claim 31, wherein the generated beam emanates from the antenna parallel with a plane of the substrate.

34. The vehicle of claim 31, wherein the substrate further comprises additional circuitry to operate the antenna.

35. The vehicle of claim 34, wherein the additional circuitry is located on an opposite side of the substrate from the antenna.

36. The vehicle of claim 34, wherein the additional circuitry is indirectly coupled to the antenna though the substrate.

37. The vehicle of claim 31, wherein the substrate is mounted at an acute angle with respect to the housing.

38. The vehicle of claim 30, wherein the radiation is approximately 77 GHz.

39. The vehicle of claim 30, wherein the transceiver assembly is mounted within a bumper on the vehicle.

40. The vehicle of claim 30, wherein the indication comprises a signal to a vehicle communication bus to reduce a speed of the vehicle.

41. The vehicle of claim 30, wherein the indication comprises an indication to a user of the vehicle.

42. The vehicle of claim 30, wherein the indication is either audible, visual, or both.

* * * * *